UNITED STATES PATENT OFFICE.

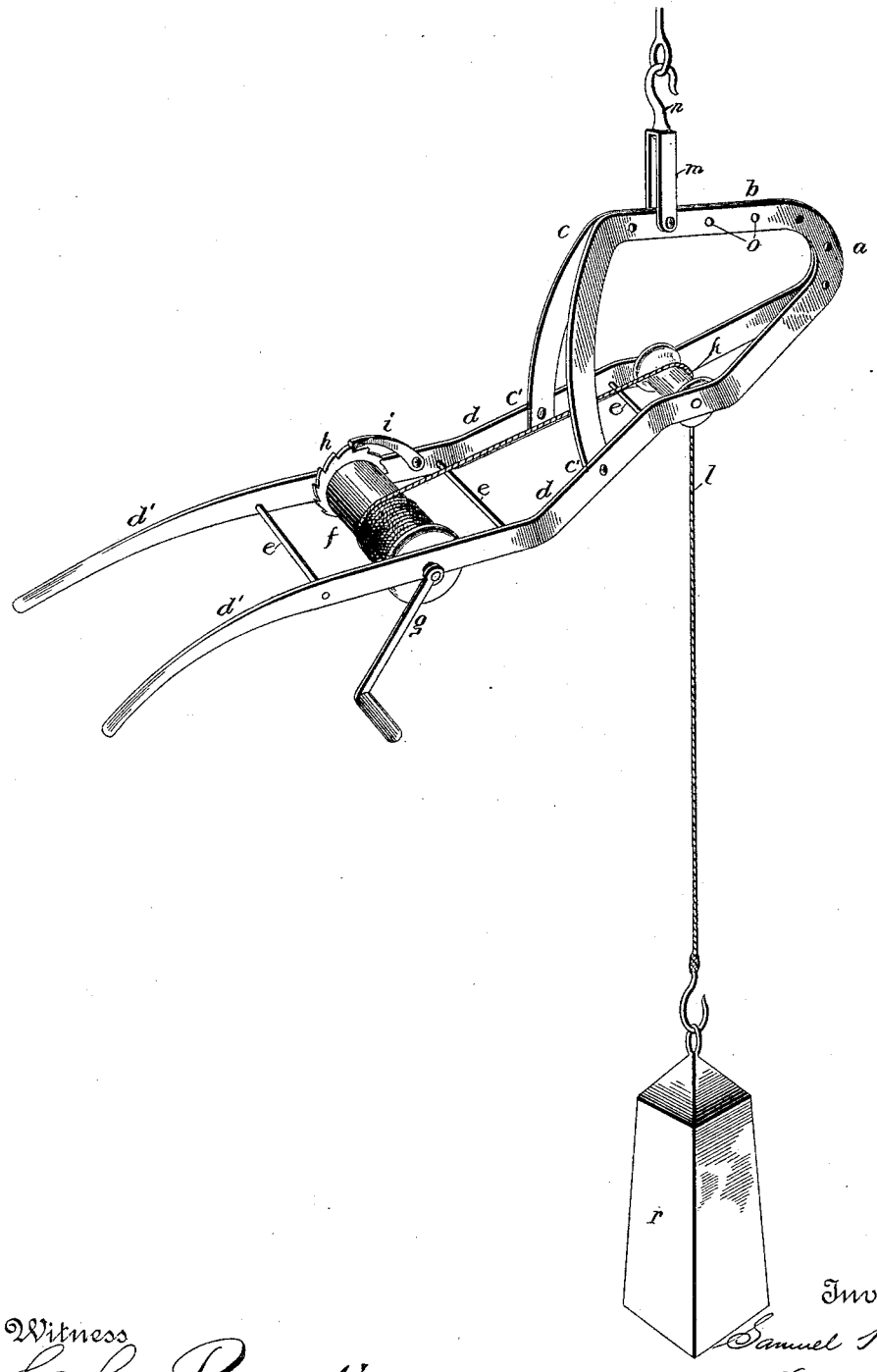

SAMUEL KAYE, OF YAZOO CITY, MISSISSIPPI.

HOISTING APPARATUS.

SPECIFICATION forming part of Letters Patent No. 462,438, dated November 3, 1891.

Application filed November 29, 1890. Serial No. 373,052. (No model.)

*To all whom it may concern:*

Be it known that I, SAMUEL KAYE, a citizen of the United States, residing at Yazoo City, in the county of Yazoo and State of Mississippi, have invented certain new and useful Improvements in Hoisting Apparatus; and I do hereby declare the following to be a full, clear, and exact description of the invention, such as will enable others skilled in the art to which it appertains to make and use the same.

My invention relates to a hoisting apparatus, and particularly to apparatus for hoisting ice, its object being to produce a device that will displace the usual endless chain used for such purpose and will be efficient and serviceable, and in which, while the whole is hung by a single swiveled hook, yet the windlass will be held in convenient position for manipulation.

To these ends my invention consists in certain features of construction, to be hereinafter described, and the novel features then particularly pointed out in the claims.

In the accompanying drawing is shown a perspective view of the apparatus in use.

The frame of the apparatus is made of strips or bars of metal or wood, which are joined together and fastened at the upturned portion $a$ and the inturned portion or top $b$, forming a crook-shaped end. The inturned ends of the strips or bars are spread apart at $c$ and at their extremities are joined at $c'$ to the sides $d$ of the strips or bars, which are spread apart from the joined portions $a$ and are continued into handles $d'$. The sides $d$ are suitably connected by the tie-bars or rods $e$.

Mounted in the sides $d$ is a windlass $f$, which at one end is provided with a hand-crank $g$ and at the other end with a ratchet-wheel $h$.

$i$ is a pawl which engages the teeth of the ratchet-wheel, preventing retrograde movement thereof.

Mounted in the sides between the portion $a$ and the points $c'$ is a pulley or sheave $k$, over which passes a rope or cable $l$, which is secured to and is adapted to be wound upon the windlass. Secured to the top portion $b$ is a bail $m$, in which is swiveled a hook $n$. The crooked portion $a$ $b$ is provided with a series of perforations $o$, which receive the pivot $p$ of the bail $m$, so that the bail can be adjusted.

The apparatus is intended for use in hoisting objects into a building, such as ice into an ice-storage house, being designed to dispense with the endless chain usually employed for such purpose. When the apparatus is out of use, the frame hangs with the handles $d'$ down below the point of support of the apparatus.

In operation the hook $n$ is engaged with a suitable elevated support, such as a hanging link at the top of a window-frame, and the apparatus thereby hung in place. It being desired to raise an object $r$, (that may indicate a block of ice,) the latter is secured to the rope or cable $l$, when the weight of the object will be sufficient to cause the handles to swing upwardly. By reason of the relative positions of the hook $n$ and the pulley $k$ the upward movement of the handles will continue until the weight on such rope causes the parts to equipoise or counterbalance; but the part of the rope below the pulley $k$ will always be to one side of the bail $m$ and its hook in vertical parallel line therewith. When the handles and windlass are thrown out by the weight of the load, it is evident that the crank of the windlass may be turned without in any manner being interfered with by the rope or the object being raised, and the handles $d'$ may then be grasped and held by the operator to steady the apparatus without his having to support the weight thereof, as would be necessary were the apparatus not held up by the weight of the load. The swiveled hook $n$ permits the complete revolution of the apparatus, so that it may be more conveniently manipulated and the handles brought within ready access. In order that the part of the rope hanging over the pulley $k$ may be on the proper side of the hook $n$ when the weights of the loads to be lifted are varied, (for otherwise the handles might be thrown up against the objects above the apparatus,) the point of connection of the bail $m$ with the frame may be changed by removing the pivot of the bail from the latter and one of the holes $o$ and reinserting it in another hole and in the bail.

What I claim as new is—

1. In a hoisting apparatus, the combination of a frame having an upturned and inturned portion, a suspension-hook connected with said inturned portion or top, a windlass and a pulley, said pulley being mounted in said frame below the hook, and a rope or cable secured to and adapted to be wound upon the windlass and passing over the pulley, substantially as and for the purpose set forth.

2. In a hoisting apparatus, the combination of a frame provided with handles at one end and having an upturned and inturned portion at the other end, a suspension-hook connected with said inturned portion or top, a windlass and a pulley, said pulley being mounted in said frame below the hook, and a rope or cable secured to and adapted to be wound upon the windlass and passing over the pulley, substantially as and for the purpose set forth.

3. In a hoisting apparatus, the combination of a frame provided with a crooked portion at one end, the sides of which frame spread from said crooked portion and are extended into handles, a suspension-hook connected with said crook at top, a windlass and a pulley mounted in said frame, said pulley being mounted in said frame below the hook, and a rope or cable secured to and adapted to be wound upon the windlass and passing over the pulley, substantially as and for the purpose set forth.

4. In a hoisting apparatus, the combination of a frame provided with handles, a swiveled hook connected with the frame, a windlass and a pulley mounted in said frame, said pulley being mounted in said frame below the hook, and a rope or cable secured to and adapted to be wound upon the windlass and passing over the pulley, substantially as and for the purpose set forth.

5. In a hoisting apparatus, the combination of a frame provided with a crooked portion at one end, having at top a hook adjustably secured thereto, a windlass and a pulley mounted in said frame, said pulley being mounted in the frame below the hook, and a rope or cable secured to the windlass and passing over the pulley, substantially as and for the purpose set forth.

6. The herein-described frame for a hoisting apparatus, the same comprising a pair of bars joined at one end of the frame and extended upward and inwardly and then spread apart, said bars being also spread apart to form the sides of the frame, with which the lower extremities of the upper spread ends are connected, and said sides being extended to form handles, substantially as set forth.

In testimony whereof I affix my signature in presence of two witnesses.

SAML. KAYE.

Witnesses:
GEO. L. WHEELOCK,
R. G. DUBOIS.